(12) United States Patent
Saito

(10) Patent No.: US 6,850,242 B1
(45) Date of Patent: Feb. 1, 2005

(54) IMAGE GENERATING SYSTEM AND PROGRAM

(75) Inventor: Kenji Saito, Saitama (JP)

(73) Assignee: Namco Ltd., Tokyo (JP)

( * ) Notice: Subject to any disclaimer, the term of this patent is extended or adjusted under 35 U.S.C. 154(b) by 397 days.

(21) Appl. No.: 09/830,467

(22) PCT Filed: Sep. 7, 2000

(86) PCT No.: PCT/JP00/06084

§ 371 (c)(1),
(2), (4) Date: May 25, 2001

(30) Foreign Application Priority Data

Sep. 9, 1999 (JP) .......................................... 11-255561

(51) Int. Cl.[7] .............................................. G09G 5/00
(52) U.S. Cl. ...................... 345/582; 345/419; 345/623; 345/473
(58) Field of Search ................................ 345/418, 419, 345/420, 426, 427, 582, 583, 623, 473, 474, 475; 463/31

(56) References Cited

U.S. PATENT DOCUMENTS

| | | | |
|---|---|---|---|
| 5,877,769 A | | 3/1999 | Shinohara |
| 6,281,904 B1 | * | 8/2001 | Reinhardt et al. .......... 345/582 |
| 6,329,988 B1 | * | 12/2001 | Watanabe et al. ........... 345/426 |
| 6,402,615 B1 | * | 6/2002 | Takeuchi ..................... 463/31 |

FOREIGN PATENT DOCUMENTS

| | | | |
|---|---|---|---|
| JP | 09-167258 | * | 6/1997 |
| JP | 9-319891 A | | 12/1997 |
| JP | 11-86025 A | | 3/1999 |
| JP | 11-134515 | * | 5/1999 |
| JP | 2000-132707 A | | 5/2000 |
| JP | 2000-279642 A | | 10/2000 |

OTHER PUBLICATIONS

Wolfgang Heidrich and Hans–Peter Seidel, Realistic, Hardware-accelerated Shading and Lighting, Jul. 1999, Proceedings of th 26th annual conference on computer graphics and interactive techniques Jul. 1999 pp. 171–178.*

Wolfgang Heidrich and Hans–Peter Seidel, View–independent Environment Maps, Aug. 1998 Proceedings of the 1998 EUROGRAPHICS/SIGGRAPH workshop on Graphics hardware pp. 39–45.*

Rui Bastos, Kenneth Hoff, William Wynn, Anselmo Lastra, Increased photorealism for interactive architectural walkthroughs, Apr. 1999 Proceedings of the 1999 Symposium on Interactive 3D graphics pp. 183–235.*

Shenchang Eric Chen, QuickTime VR: an image–based approach to virtual enviroment navigation , Sep. 1995 Proceedings of the 22nd annual conference on Computer graphics and interactive techniques pp. 29–38.*

DOS/Vmagazine Dai 8 Kam Dai 5 Gou Soft Bank Kabusiki Kaisha (Mar. 1, 1999) p. 189–190.

* cited by examiner

Primary Examiner—Michael Razavi
Assistant Examiner—Faranak Fouladi
(74) Attorney, Agent, or Firm—Oliff & Berridge, PLC

(57) ABSTRACT

It is an objective to provide a image generating system and program capable of performing an environment mapping which can accurately represent the reflection of light source and the like. An environment texture to be viewed in an upward direction from an object is mapped onto the object in a direction toward the object from above the object without depending on the position or rotational angle of a virtual camera. A rotation matrix obtained from the rotational angle of the object about an axis in the world coordinate system is used to rotate the normal vector of the object. The coordinates NXW and NZW of the rotated normal vector are then used to obtain coordinates U and V. Another rotation matrix for transforming the local coordinate system to a coordinate system (XW, ZW, YW) may be used. With a surface of the object of which normal vector is oriented downwardly and slantingly with respect to the horizontal direction, an environment texture to be mapped when the normal vector is oriented to the horizontal direction is mapped, or the environment mapping may be omitted. The environment texture may be one that increases its brightness when the normal vector of the object is oriented toward a light source or shading processing.

10 Claims, 15 Drawing Sheets

COMPARATIVE EXAMPLE

COMPARATIVE EXAMPLE

PROVISION OF ENVIRONMENT TEXTURE

MAPPING OF ENVIRONMENT TEXTURE

COMPARATIVE EXAMPLE

↑
VIRTUAL CAMERA AND LIGHT SOURCE

COMPARATIVE EXAMPLE

LIGHT SOURCE

↑
VIRTUAL CAMERA

PRESENT EMBODIMENT

↑
VIRTUAL CAMERA AND LIGHT SOURCE

PRESENT EMBODIMENT                          LIGHT SOURCE

↑
VIRTUAL CAMERA

OMISSION OF ENVIRONMENT MAPPING

IMAGE GENERATING SYSTEM AND PROGRAM

TECHNICAL FIELD

The present invention relates to an image generating system and program.

BACKGROUND OF ART

There is known an image generating system for generating an image viewed from a given viewpoint in an object space which is a virtual three-dimensional space. Such an image generating system is very popular since a so-called virtual reality is provided. Where the image generating system is applied to a racing game, a player can enjoy the three-dimensional game by controlling a racing car (or object) for causing his or her racing car to run in the object space and also to compete against racing cars controlled by other players or computer.

Such an image generating system raises an important technical problem in that more realistic images must be generated to improve the virtual reality for the players. One of the techniques to overcome such a problem is known as an environment mapping technique.

The environment mapping maps an environment texture representing the surrounding environment of an object thereon to represent a reflection of the environment onto the object so that the reality of the object image will be improved.

The following example of the environment mapping techniques (which will be called "comparative environment mapping") may be considered.

In the comparative environment mapping, an environment texture viewable from the object toward a virtual camera is previously provided. This environment texture is then mapped from the virtual camera (or in a direction from the virtual camera toward the object). Thus, the environment can be reflected onto the object even when the virtual camera is moved and a gazing point of the virtual camera moves behind the object.

However, this comparative environment mapping has a problem in that a light source cannot accurately be reflected onto the object.

More particularly, it is now assumed that the positional relationship among an object (car) 10, a virtual camera 12 and a shading light source 14 is as shown in FIG. 1. In this case, the shading ought to create the reflection of light source at a location A1 in FIG. 1. Moreover, a shadow 16 of the object 10 should fall at another location A2 in FIG. 1.

However, the comparative environment mapping always maps the environment mapping starting from the virtual camera. If the comparative environment mapping is to represent the reflection of light source, therefore, the light source will always be reflected onto a gazing location of the virtual camera 12 on the object 10. In other words, the light source will be reflected onto a location A3 rather than the location A1 in FIG. 1. The resulting image will contain nonconformity. To overcome such a problem, the comparative environment mapping must map only an environment without the light source onto the object, rather than mapping the light source.

DISCLOSURE OF INVENTION

It is therefore an objective of the present invention to provide an image generating system and program which can provide an environment mapping capable of accurately representing the reflection of light source.

To this end, the present invention provides an image generating system comprising: means for reading a texture of an environment to be viewed in an upward direction from an object out from texture storage means and for mapping the read environment texture onto the object in a direction toward the object from above the object independently of a position or a rotational angle of a virtual camera; and means for drawing an image viewed from the virtual camera within an object space in which the object moves.) The present invention also provides a computer-readable information storage medium comprising a program for executing the above described means. The present invention further provides a computer-usable program embodied on an information storage medium or in a carrier wave, comprising a processing routine for executing the above described means.

According to the present invention, the environment texture to be viewed in an upward direction from the object is provided, rather than the environment texture to be viewed from the virtual camera (or viewpoint). This environment texture is mapped on the object in a direction from above the object toward the object, rather than from the virtual camera. Therefore, the present invention can prevent the environment mapping from being influenced by any change in the position or rotational angle of the virtual camera. As a result, the present invention will overcome such an unfavorable condition that the light source is always reflected into the gazing location of the virtual camera and can also realize the environment mapping in which the reflection of light source into any other location can accurately be represented.

In the image generating system, information storage medium and program according to the present invention, a rotation matrix obtained based on a rotational angle of the object about each of axes in a world coordinate system may be used to rotate a normal vector of a surface of the object, and first and second texture coordinates for reading the environment texture out from the texture storage means may be obtained based on first and second coordinates of the rotated normal vector. Thus, the normal vector of the surface of the object will be rotated according to a change of the rotational angle in the object, and the read texture coordinates will be changed. Therefore, the reflection of environment onto the object will also be changed according to the change of the rotational angle of the object, and an unexpectedly realistic image will be generated.

The normal vector of the surface of the object may be given to each of the vertexes in the same surface. Or it may be a normal vector at the representative point or each dot on the surface of the object.

In the image generating system, information storage medium and program according to the present invention, the rotation matrix may transform a local coordinate system (XL, YL, ZL) of the object to a coordinate system (XW, ZW, YW), when the local coordinate system is (XL, YL, ZL) and a world coordinate system is (XW, YW, ZW), and the first and second coordinates may be XW and YW coordinates, respectively. Thus, the second texture coordinate which belongs to the Y-field can be obtained based on the YW coordinate belonging to the same Y-field. This simplifies the process.

In the image generating system, information storage medium and program according to the present invention, with a surface of the object of which the normal vector is oriented downwardly and slantingly with respect to a horizontal direction, an environment texture to be mapped when the normal vector of a surface of the object is oriented horizontal or substantially horizontal may be mapped. Alternatively, in the image generating system, information storage medium and program according to the present invention, the environment mapping may be omitted in respect of the surface of the object of which the normal vector is oriented downwardly and slantingly with respect to a horizontal direction. This can realize a proper environment mapping without causing any unfavorable condition, even though the virtual camera looks the underside of the object.

In the image generating system, information storage medium and program according to the present invention may further comprise means for performing shading processing, and brightness of the environment texture may increase when the normal vector of the surface of the object is oriented toward a light source for the shading processing. Thus, any inconsistency between the direction of the light source for shading processing and the location at which the light source is reflected into the object, may be prevented from occurring. Therefore, a more natural and realistic image can be generated.

BEST MODES FOR CARRYING OUT THE INVENTION

A preferred embodiment of the present invention will now be described with reference to the drawings. The present invention will be described in connection with a racing game, but may similarly be applied to any of various other games.

1. Configuration

Figure 2:
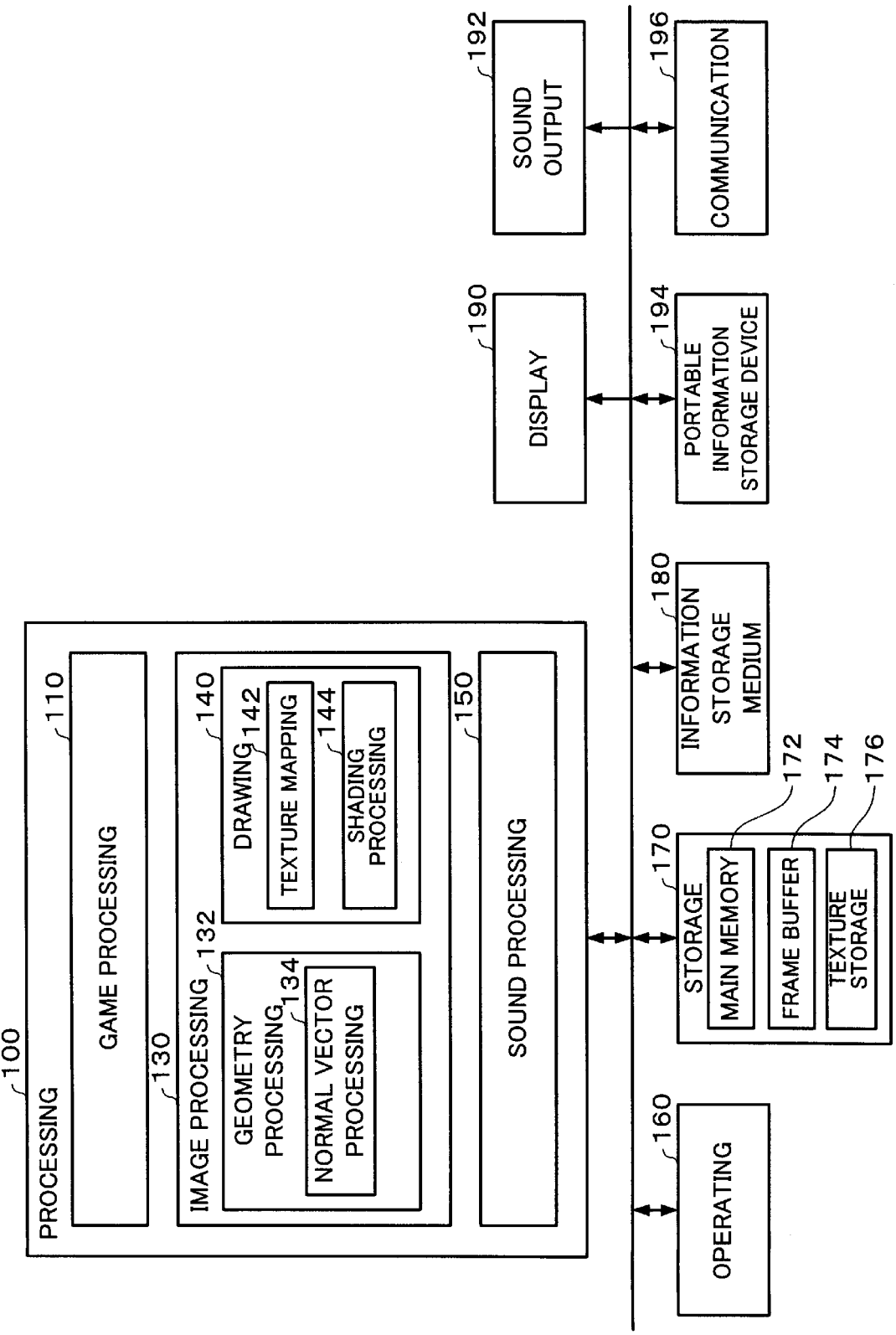
FIG. 2 is a block diagram of an image generating system according to the present embodiment.

FIG. 2 shows a block diagram of this embodiment. In this figure, this embodiment may comprise at least a processing section 100 or a processing section 100 with a storage section 170 or a processing section 100 with a storage section 170 and an information storage medium 180. Each of the other blocks (e.g., control section 160, display section 190, sound output section 192, portable information storage section 194 and communication section 196) may take any suitable form.

The processing section 100 is designed to perform various processings for control of the entire system, commands to the respective blocks in the system, game processing, image processing, sound processing and so on. The function thereof may be realized through any suitable hardware means such as processor (CPU, DSP and so on) or ASIC (or gate array or the like) or a given program (or game program).

The control section 160 is used to input operational data from the player and the function thereof may be realized through any suitable hardware means such as a lever, a button, a housing or the like.

The storage section 170 provides a working area for the processing section 100, communication section 196 and others. The function thereof may be realized by any suitable hardware means such as RAM or the like.

The information storage medium (which may be a computer-readable storage medium) 180 is designed to store information including programs, data and others. The function thereof may be realized through any suitable hardware means such as optical memory disk (CD or DVD), magneto-optical disk (MO), magnetic disk, hard disk, magnetic tape, memory (ROM) or the like. The processing section 100 performs various processings in the present invention (or this embodiment) based on the information that has been stored in this information storage medium 180. In other words, the information storage medium 180 stores various pieces of information (programs and data) for executing the means of the present invention (or this embodiment) which is particularly represented by the block included in the processing section 100.

Part or the whole of the information stored in the information storage medium 180 will be transferred to the storage section 170 when the system is initially powered on. The information stored in the information storage medium 180 may contain at least one of program code set for processing the present invention, image data, sound data, shape information of objects to be displayed, table data, list data, command information for the processings in the present invention, information for performing the processings according to the commands and so on.

The display section 190 is designed to output an image generated according to the present embodiment. The function thereof may be realized by any hardware structure such as CRT, LCD or HMD (Head Mount Display).

The sound output section 192 is designed to output a sound generated according to the present embodiment. The function thereof may be realized by any hardware structure such as a speaker or the like.

The portable information storage section 194 is designed to store player's personal data, game data and so on and may take any of various forms such as memory card, portable game machine and so on.

The communication section 196 is designed to perform various controls for communication between the game system and any external device (e.g., host device or other image generating system). The function thereof may be realized through any suitable hardware means such as processor or communication ASIC or according to a program.

Program or data for executing the means in the present invention (or this embodiment) may be delivered from an information storage medium included in a host device (or server) to the information storage medium 180 through a network and the communication section 196. The use of such an information storage medium in the hose device (or server) falls within the scope of the invention.

The processing section 100 includes a game processing section 110, an image processing section 130 and a sound processing section 150.

The game computing section 110 is designed to perform various processes such as coin (or charge) reception, setting of various modes, game proceeding, setting of scene selection, determination of the position and rotation angle (about X-, Y- or Z-axis) of an object, object moving processing (or motion processing), determination of the position of the view point (or virtual camera) and the visual angle of the view point (or the rotational angle of the virtual camera), arrangement of the object (or map object) within the object space, hit checking, computation of the game results (or scores), processing for causing a plurality of players to play in a common game space or various game computations including game-over and other processes, based on operational data from the control section 160 and the personal data, saved data and game program from the portable information storage section 194.

The image processing section 130 is designed to execute various image processings according to commands or others from the game processing section 110. The sound processing section 150 is designed to execute various sound processings according commands or others from the game processing section 110.

All the functions of the game, image and sound processing sections 110, 130, 150 may be realized in a manner of hardware or program. Alternatively, they may be realized in both the manners of hardware and program.

The image processing section 130 includes a geometry processing section (or three-dimensional computation section) 132 and a drawing (or rendering) section 140.

The geometry processing section 132 performs various geometry processings (or three-dimensional computations) such as coordinate transformation, clipping, perspective transformation and light source calculation. In this embodiment, object data such as object vertex coordinates, vertex texture coordinates, brightness data or the like which are obtained after the geometry processing (or perspective transformation) are stored and saved in a main memory 172 in the storage section 170.

The drawing section 140 is designed to draw an object on a frame buffer 174, based on the object data after the geometry processing (or perspective transformation) and a texture stored in a texture storage section 176. Thus, an image viewed from the virtual camera (or view point) can be drawn (or generated) within the object space in which the object moves.

The drawing section 140 includes a texture mapping section 142 and a shading processing section 144.

In this embodiment, an environment texture to be viewed upwardly from the object (or a texture as viewed through a fish-eye lens) is previously provided in the texture storage section 176. The texture mapping section 142 reads this environment texture out of the texture storage section 176. The read environment texture is then mapped onto the object in a downward direction from there above (in a direction toward the object from above the object). Thus, there can be realized an environment mapping which accurately represents the reflection of light source and so on, even if the position or rotational angle (direction) of the virtual camera has been changed.

The shading processing section 144 is designed to perform the shading process for the object. More particularly, the geometry processing section 132 performs the calculation of light source and then determines the brightness (RGB) at each of the vertexes on the object, based on information of the shading light source, illumination model or normal vector at each of the vertexes in the object. The shading processing section 144 determines the brightness at each dot on a primitive surface (polygon or curved face) through the Gouraud shading or the like, based on the determined brightness at each vertex.

The geometry processing section 132 includes a normal-vector processing section 134 which is designed to rotate the normal vector on the object at each vertex (which in a broad sense, is a normal vector of the surface of the object) through a rotation matrix from the local coordinate system to the world coordinate system. In this embodiment, the texture coordinate of the environment texture is determined based on the coordinates X, z of the rotated normal vector.

The image generating system of the present embodiment may be in the form of a single-player mode in which only a single player plays the game or a multi-player mode in which a plurality of players play the game.

In the multi-player mode, game images and sounds provided from the players may be generated by use of a single terminal or a plurality of terminals which are connected together through a network (transmission line or communication line).

2. Features of the Present Embodiment

Figure 1:
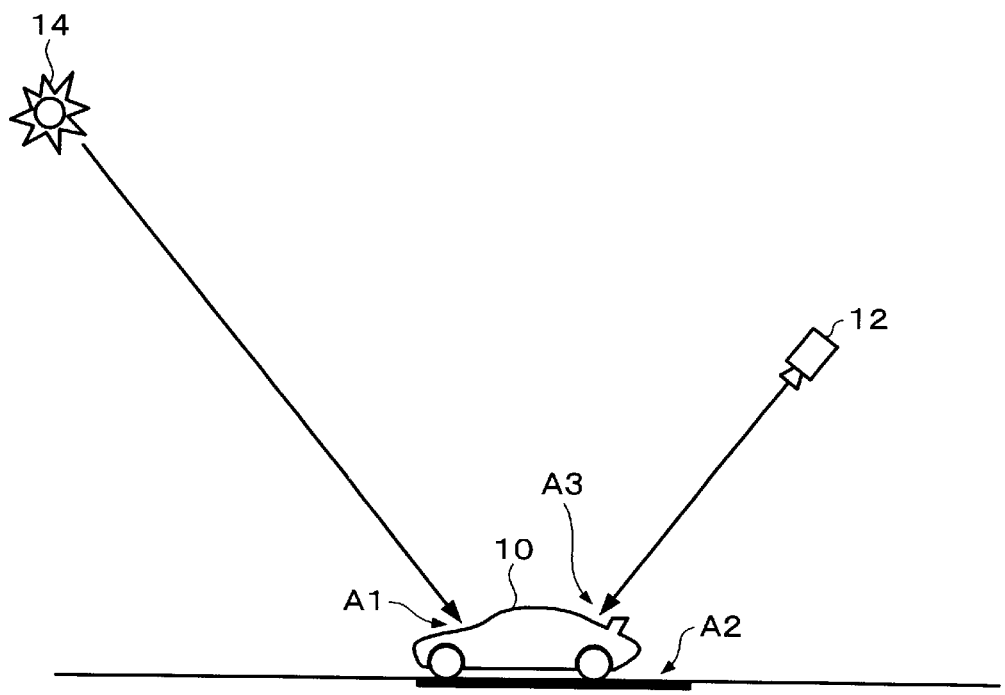
FIG. 1 is a view illustrating the problem in the comparative environment mapping.

In the comparative environment mapping illustrated in FIG. 1, the environment texture viewed from the object toward the virtual camera is previously provided. This environment texture is mapped onto the object from the virtual camera.

According to the comparative environment mapping, even though the virtual camera gazes any location on the object, the environment can be reflected onto that location. In other words, an unnatural image may be generated, if the environment is not reflected on the object when the virtual camera is moved to look the backside of the object.

However, this comparative environment mapping raises a problem in that the reflection of light source cannot accurately be represented. As described in connection to FIG. 1, the light source will always be reflected onto the gazing location of the virtual camera. The resulting image has an inconsistency.

Figure 3:
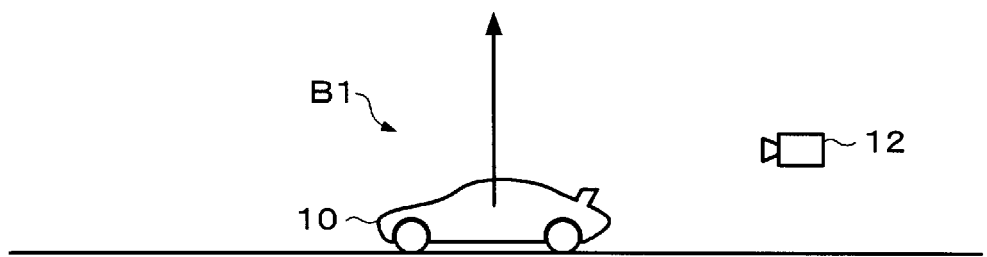
FIG. 3 is a view illustrating the environment mapping technique in the illustrated present embodiment.
Figure 3:
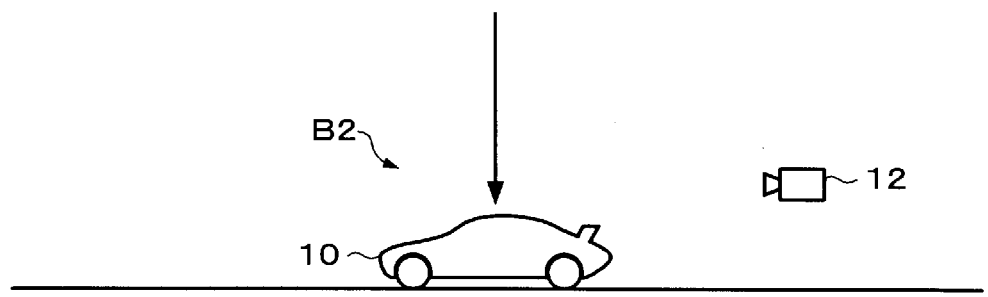
Figure 4:
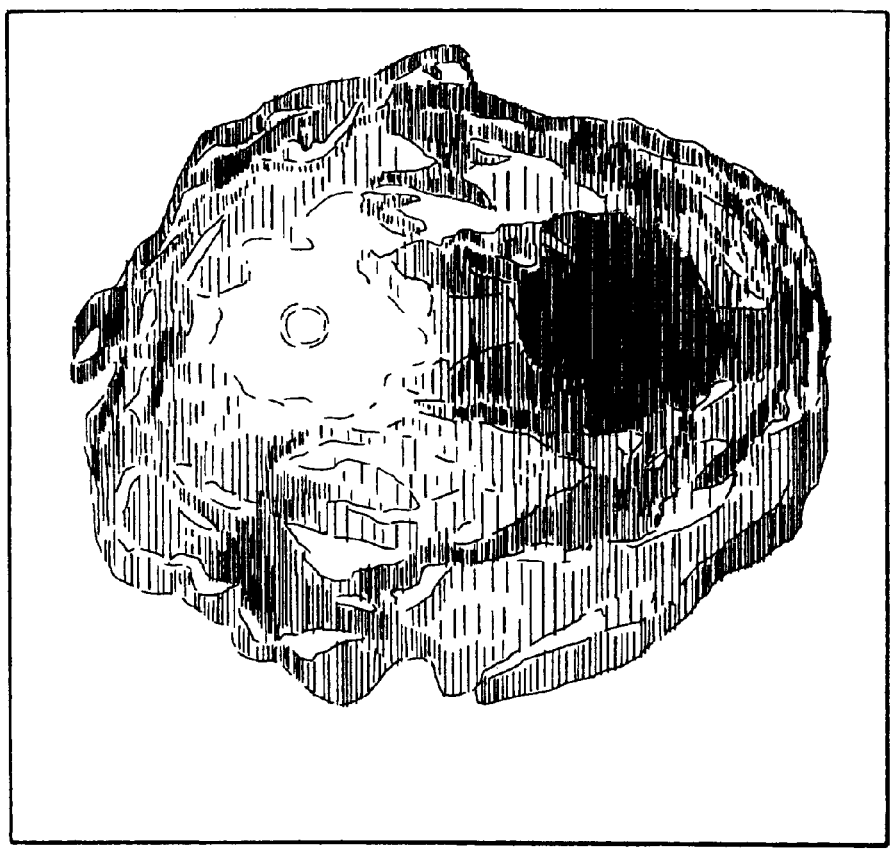
FIG. 4 is a view showing an example of the environment texture.

To overcome such a problem, there is first provided an environment texture which should be viewed upwardly (or in the upward direction) from the object 10 (model object), as shown by B1 in FIG. 3. Such an environment texture is shown in FIG. 4. This environment texture is drawn as if the surrounding environment including the sun, sky, clouds and so on to be reflected on the object 10 is viewed in the upward direction through a fish-eye lens. The environment texture may be switched to another environment texture through time passage or game progress.

In this embodiment, as shown by B2 in FIG. 3, the provided environment texture is mapped onto the object from above the object (or in the direction toward the object from above the object) without depending on the position or rotational angle (direction) of the virtual camera 12. Thus, there can be realized an environment mapping which can accurately represent the reflection of light source and so on.

Figure 5A:
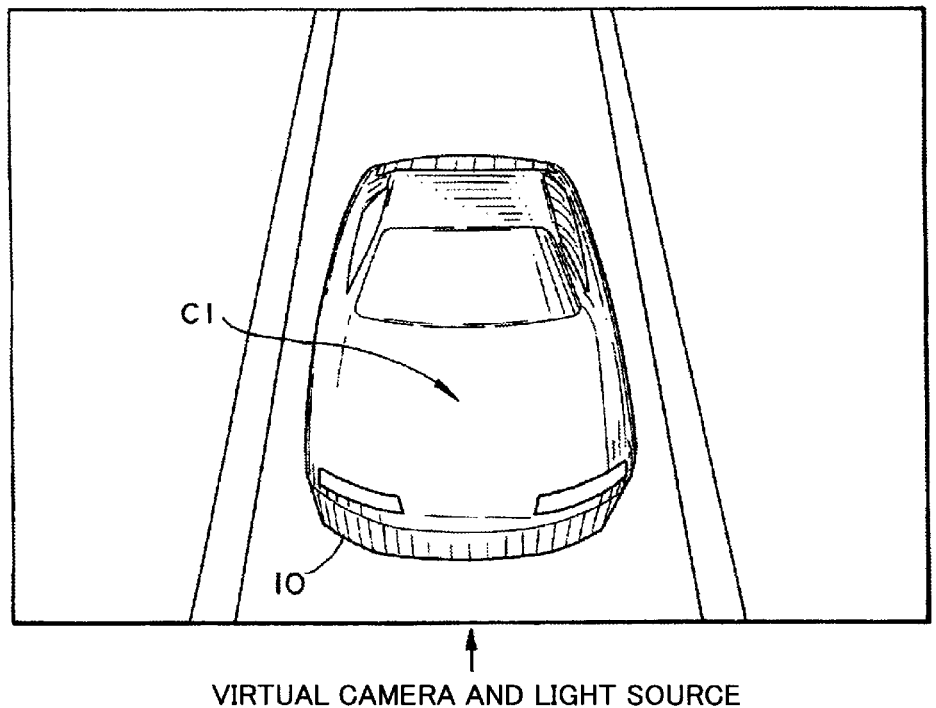
FIGS. 5A and 5B show images generated by the comparative environment mapping.
Figure 5B:
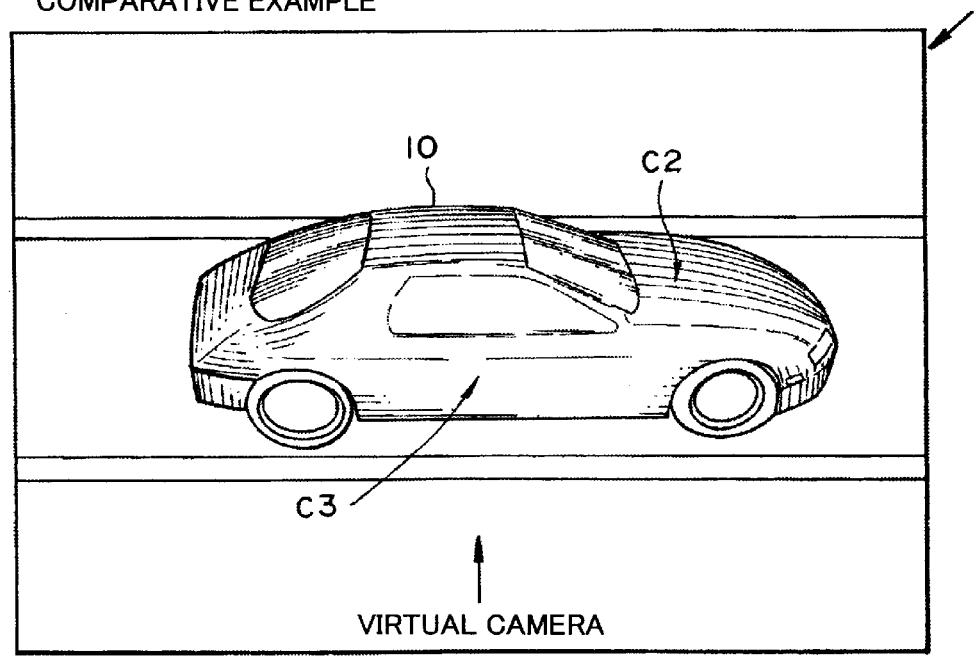

FIGS. 5A and 5B show images obtained by the comparative environment mapping illustrated in connection with FIG. 1.

In FIG. 5A, a light source (evening glow) to be reflected by the environment texture as well as a virtual camera are in front of the object 10. In this case, the light source (evening glow) is reflected on the front of the object 10 as shown by C1. This provides a consistent image.

On the other hand, FIG. 5B shows that the light source is in front of the object 10 while the virtual camera is in the right of the object 10. In this case, the comparative environment mapping reflects the light source on the right side of the object 10 as shown by C3, regardless of that the light source should be reflected into a location C2. In other words, the light source will be reflected into a location which does not correspond to the actual direction of the light source. Thus, an inconsistent image will be generated.

Figure 6A:
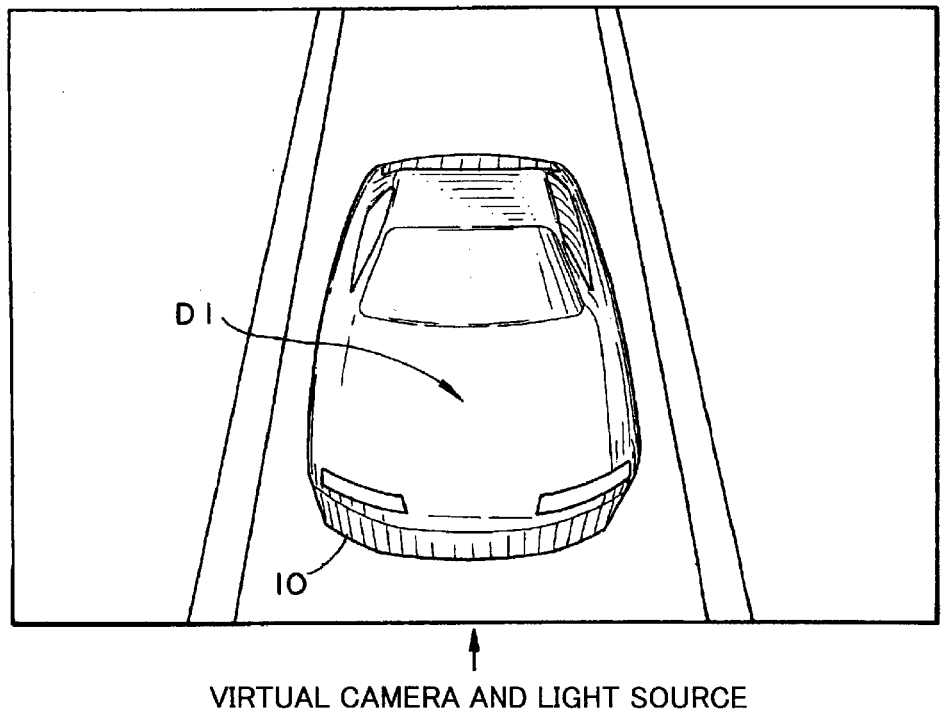
FIGS. 6A and 6B show images generated by the environment mapping of the present embodiment.
Figure 6B:
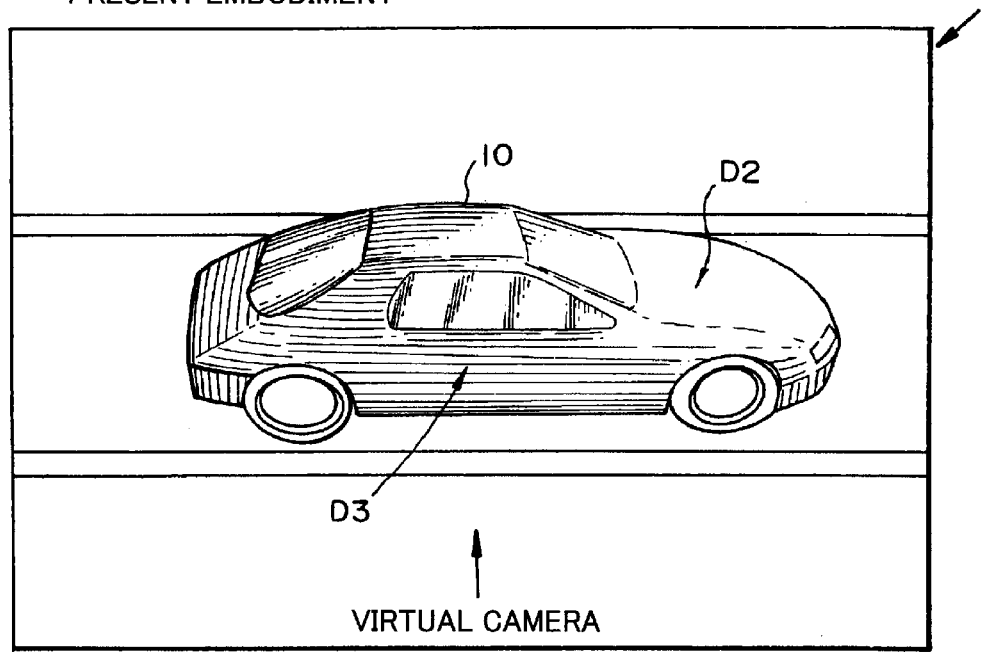

FIGS. 6A and 6B show images obtained through the environment mapping according to the present embodiment.

In FIG. 6A, both the light source and virtual camera are in front of the object 10, as in FIG. 5A. The light source is properly reflected on the front side of the object 10 as shown by D1, resulting in a consistent image.

On the other hand, FIG. 6B shows that the light source is in front of the object 10 while the virtual camera is in the right of the object 10, as in FIG. 5B. In this case, the environment mapping of the present embodiment will not reflect the light source on a location D3 unlike FIG. 5B and will properly reflect the light source on a location D2. In other words, the light source will accurately be reflected a location which corresponds to the actual direction of light source, resulting in a consistent image. In such a manner, the present embodiment will accurately reflect the light source on the location which corresponds to the actual direction of light source, without depending on the position or direction of the virtual camera. Therefore, the reflection of light source can be realized without consistency, which would be abandoned in the comparative environment mapping due to inconsistency.

Figure 7:
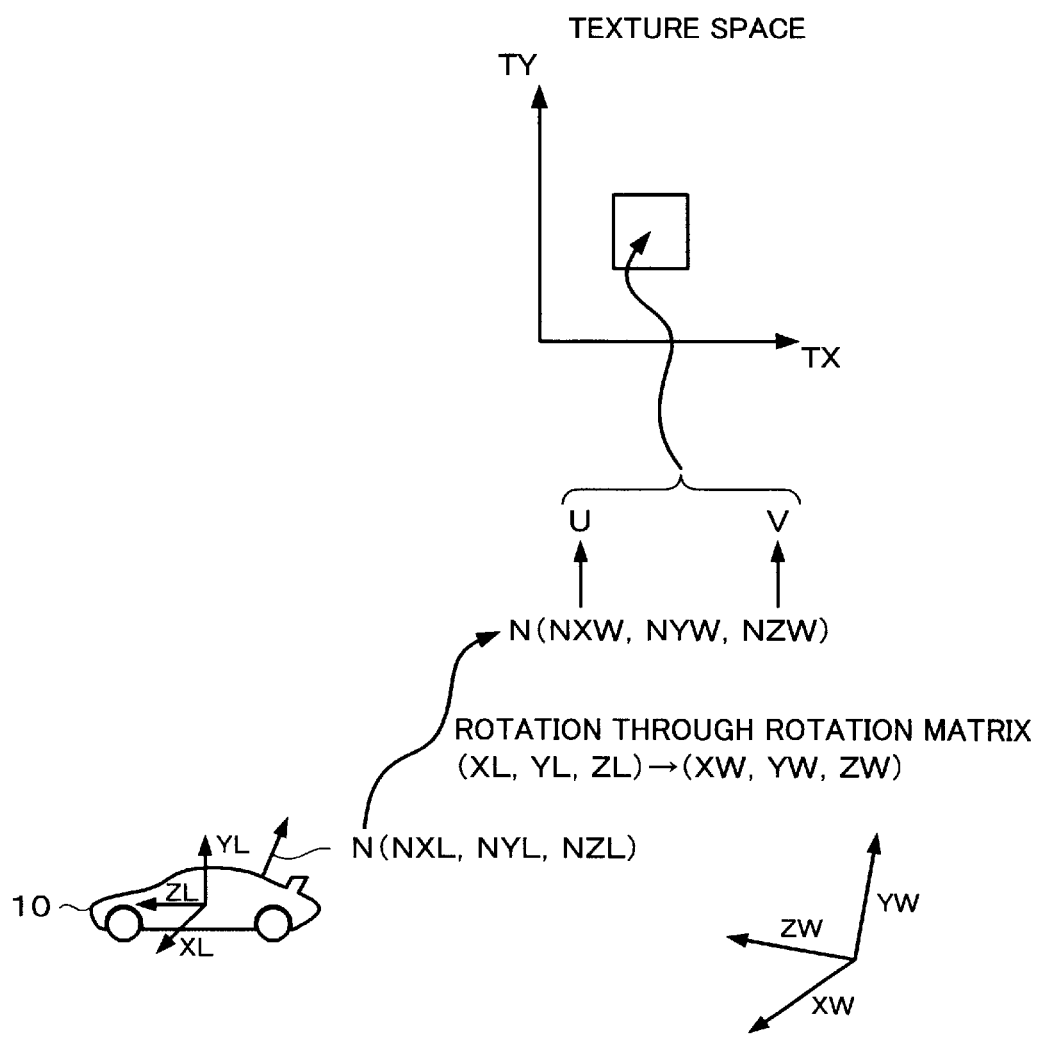
FIG. 7 is a view illustrating a technique of determining texture coordinates by causing a rotation matrix to rotate a normal vector.

FIG. 7 illustrates a technique of determining the texture coordinates of the environment texture which is to be mapped onto the object 10.

First of all, a rotation matrix, for example, from the local coordinate system (XL, YL, ZL) to the world coordinate system (XW, YW, ZW) is determined based on the rotational angle of the object about each of the axes in the world coordinate system. The rotational angle of the object 10 about each axis in the world coordinate system will be determined in real time for each frame, based on the operational data (player's control data) from a player, a game program (for controlling the motion of the object 10) and other data. The determined rotational angles are used to determine the rotation matrix.

The determined rotation matrix is then used to rotate a normal vector N (or a vector representing the orientation of the surface) on each surface in the object 10. It is desirable that the normal vector is one given to each of the vertexes on each surface (polygon) of the object 10, but it may be a normal vector on the representative point or each dot on each surface. Base on the coordinates NXW, NZW in the rotated-normal vector N, there is then determined coordinates U, V (which in a broad sense, are texture coordinates) for the texture mapping. These coordinates U, V are then used to read the corresponding texture out of the texture storage section.

The actual texture coordinates TX, TY in the texture space will be specified based on the above coordinates U and V, the offset addresses (base addresses) of the texture coordinates, information of texture size and so on.

Although FIG. 7 shows that the normal vector N is rotated through the rotation matrix from the local coordinate system (XL, YL, ZL) to the world coordinate system (XW, YW, ZW), the normal vector N may be rotated through a rotation matrix from the local coordinate system (XL, YL, ZL) to a coordinate system (XW, ZW, YW). When the normal vector N is rotated through such a rotation matrix, the coordinates NXW and NYW of the rotated normal vector N can be used to determine the coordinates U and V for texture mapping. This reduces the load on the process.

In the arrangement of FIG. 7, the coordinate NZW belonging to Z-field must be used to determine a coordinate V belonging to Y-field different from the Z-field. This provides an additional process. On the contrary, the arrangement of FIG. 8 only requires the use of the coordinate NYW belonging to the Y-field to determine the coordinate V belonging to the same Y-field. This provides no additional process. Thus, the load on the process can be reduced.

When the normal vector is rotated through the rotation matrix with the rotated normal vector being then used to determine the coordinates U and V of the texture mapping as described, there can be realized a proper environment mapping corresponding to the position or direction of the object.

Figure 9:
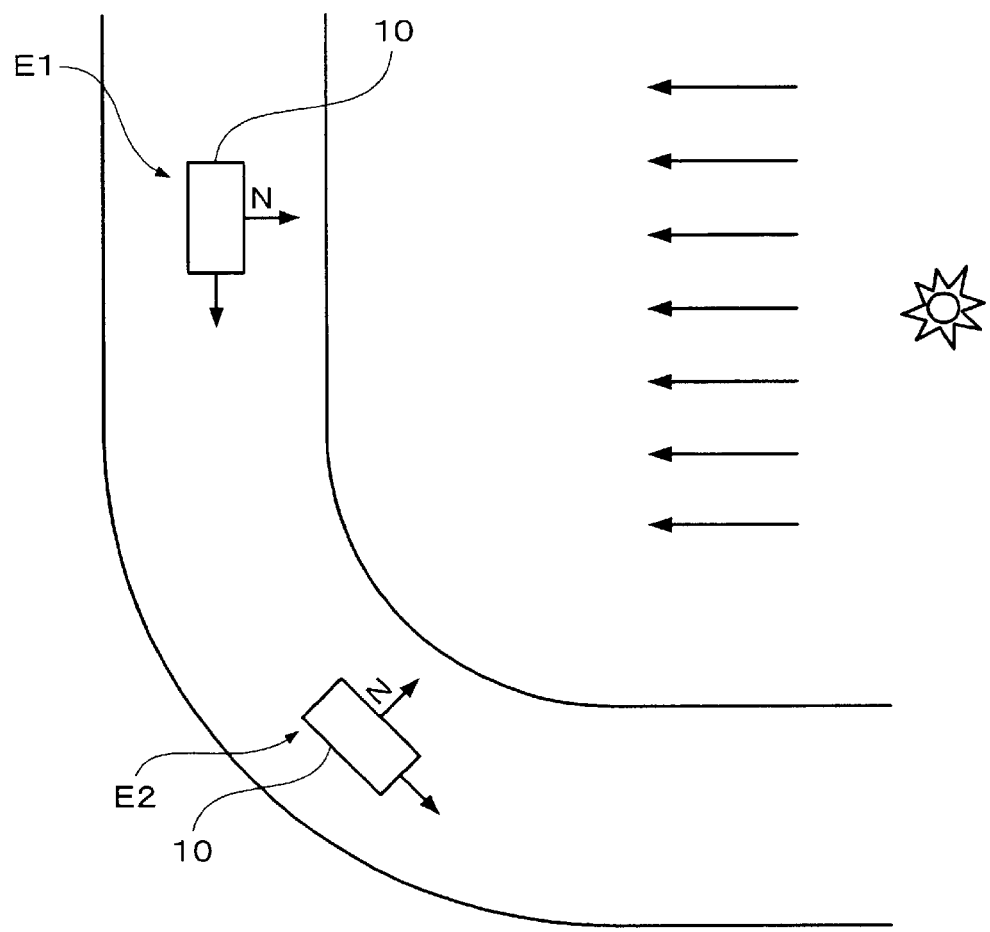
FIG. 9 is a view illustrating how a light source is reflected onto an object depending on the rotational angle of the object.

As shown at E1 in FIG. 9, the brightness of the light source reflected onto the 'side of the object 10 is maximized because the normal vector N on the side of the object 10 coincides with the light source (or light source vector) in the opposite direction (or a differential angle being equal to 180 degrees). On the other hand, as shown at E2 in FIG. 9, the brightness of the light source reflected on the side of the object 10 is reduced smaller than that of E1 because the normal vector N on the side of the object 10 does not coincide with the light source (or the differential angle being smaller than 180 degrees). When the position or direction of the object 10 is changed, therefore, the reflection of light source will be changed depending on the changed position or direction of the object 10. This provides a new and realistic image.

Figure 10A:
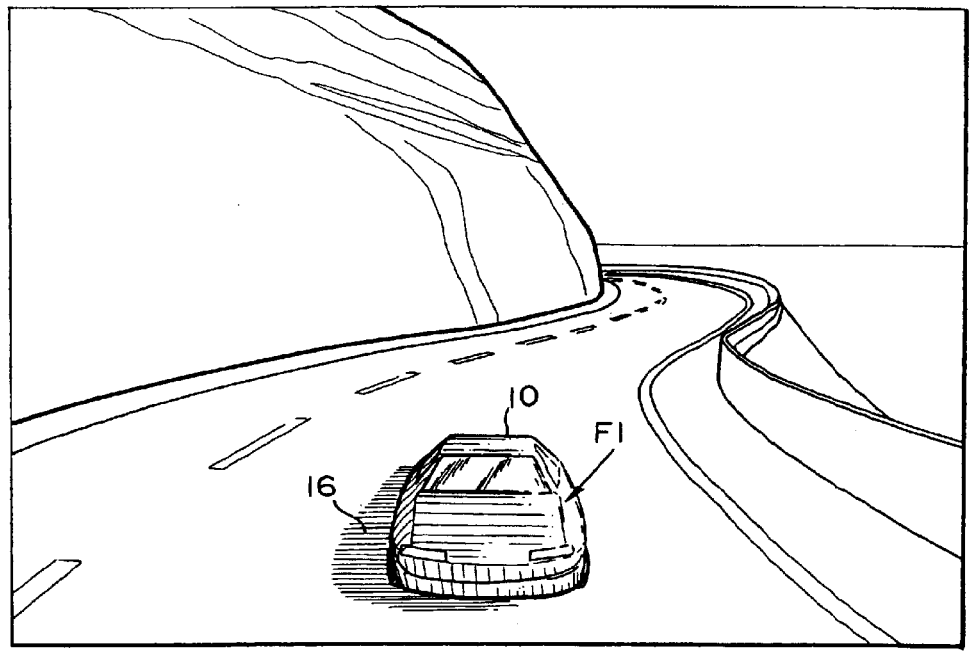
FIGS. 10A and 10B are game scenes generated according to the present embodiment.
Figure 10B:
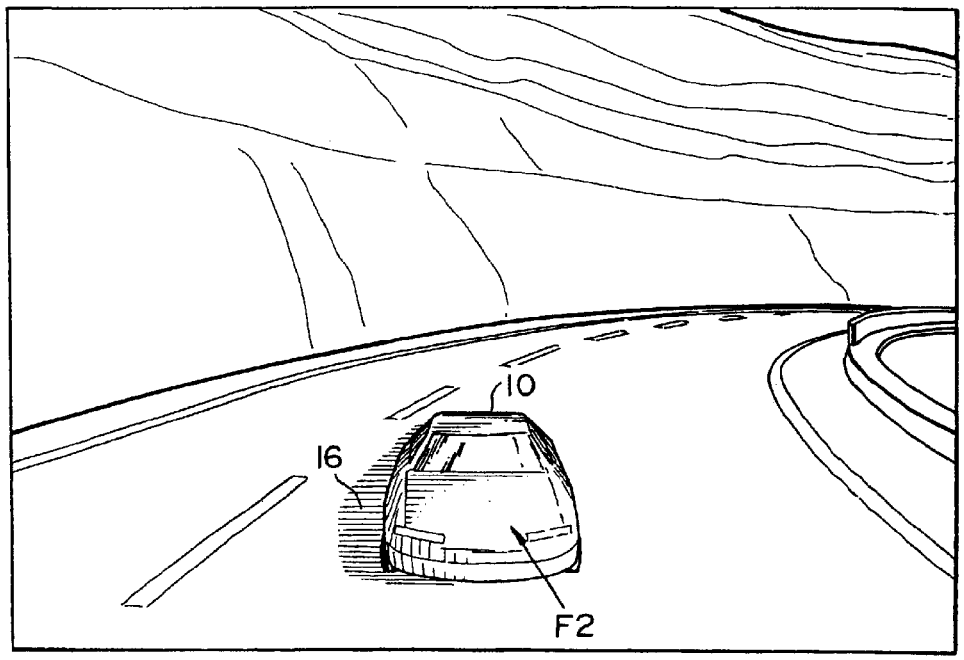

Images which can be generated according to the present embodiment are shown in FIGS. 10A and 10B.

In FIG. 10A, the left side of the object 10 (or the right side thereof as viewed in the screen) is illuminated by the light source. In this case, the environment mapping of the present embodiment successfully causes the light source to be reflected onto the left side of the object as shown at F1. This provides no inconsistency between the environment mapping and the shading for the object 10. According to the present embodiment, the shape and position of a shadow 16 of the object 10 on the road can be represented without inconsistency.

On the other hand, FIG. 10B shows that the leftward and forward side of the object 10 (or the rightward and forward side thereof as viewed in the screen) is illuminated by the light source. In this case, the environment mapping of the present embodiment successfully causes the light source to be reflected onto the leftward and forward side of the object 10 as shown at F2. This also provides no inconsistency between the environment mapping and the shading for the object 10. The shape and position of a shadow 16 of the object 10 on the road can also be represented without inconsistency.

The technique of the present embodiment in which the environment texture is mapped on the object from there above is particularly effective for a racing game in which it is extremely rare that the underside of the object is viewed, for example.

For example, in a flight simulator game, the underside of an aircraft may frequently be viewed by a virtual camera. In such a case, the environment mapping of the present embodiment may provide a defect that the sky is reflected onto the underside of the aircraft. To overcome such a problem, it is desirable to use the following technique.

Figure 11A:
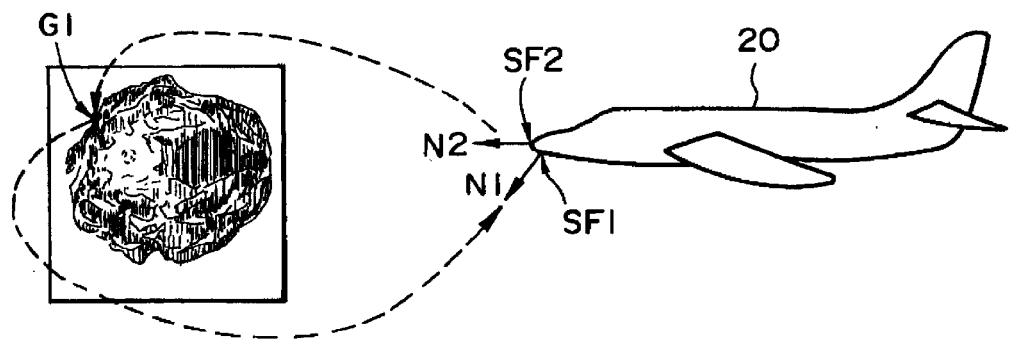
FIGS. 11A and 11B illustrate a technique of overcoming a defect which is raised when a virtual camera looks the underside of the object.

In FIG. 11A, for example, a normal vector N1 on a surface SF1 of an object (aircraft) 20 is oriented slantingly and downwardly relative to the horizontal direction. In this case, a texture to be mapped onto another surface SF2 of a normal vector N2 in the horizontal or substantially horizontal direction (e.g., a texture at a position shown by G1) is mapped onto the surface SF1. In other words, a limit value is set on a texture coordinate system. Thus, a proper environment mapping can be realized even though the virtual camera looks the underside of the object 20.

This technique is particularly advantageous in that even when one environment texture is switched to another environment texture (e.g., a environment texture for night is switched to the other environment texture for daytime), the environment mapping can be realized reflecting that switching.

Figure 11B:
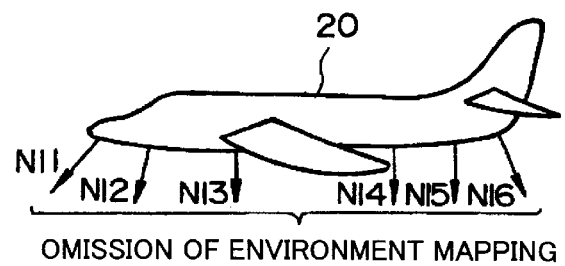

In FIG. 11B, the environment mapping is omitted for normal vectors N11, N12, N13, N14, N15 and N16 oriented slantingly and downwardly relative to the horizontal direction. Thus, it can be avoided that the sky will be mapped onto the unsderside of the object 20.

It is further desirable that when the light source is to be reflected onto the object, the light source of the environment texture is disposed at a position corresponding to the direction of the shading light source (light source for shading processing) Thus, there will not be provided any inconsistency between the reflection of light source due to the environment mapping and the shading of the object.

Figure 12:
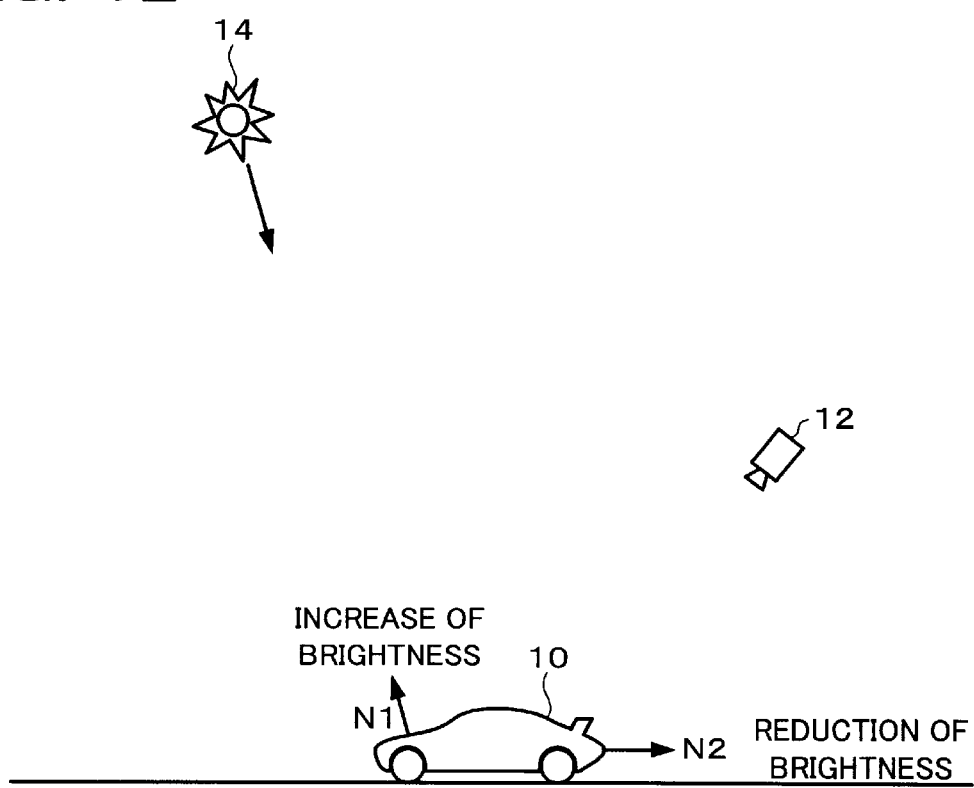
FIG. 12 is a view illustrating a technique of maintaining a consistency between the direction of a shading light source and the reflection of light source from the environment mapping.

More particularly, as shown in FIG. 12, the environment texture is provided such that the normal vector of the surface of the object 10 has an increased brightness when it is oriented toward a shading light source 14 (see FIG. 4). More particularly, the environment texture is caused to have an increased (or maximized) brightness for a surface having its normal vector N1 oriented toward the light source 14 and a reduced brightness for a surface having its normal vector N2 not oriented toward the light source 14. This environment texture is then used to perform the mapping for the object 10. Thus, the consistency can be maintained between the reflection of light source due to the environment mapping and the shading process. As a result, such more realistic and natural images as shown in FIGS. 10A and 10B can be generated.

As described in connection with FIGS. 7 to 9, this embodiment rotates the normal vector through the rotation matrix and also changes the read texture-coordinates, depending on the changed rotational angle of the object 10 and so on. Even though the position of the light source on the environment texture is stationary, therefore, the light source of the environment texture can be reflected into a proper location corresponding to the changed rotational angle of the object 10.

3. Processing in this Embodiment

Figure 13:
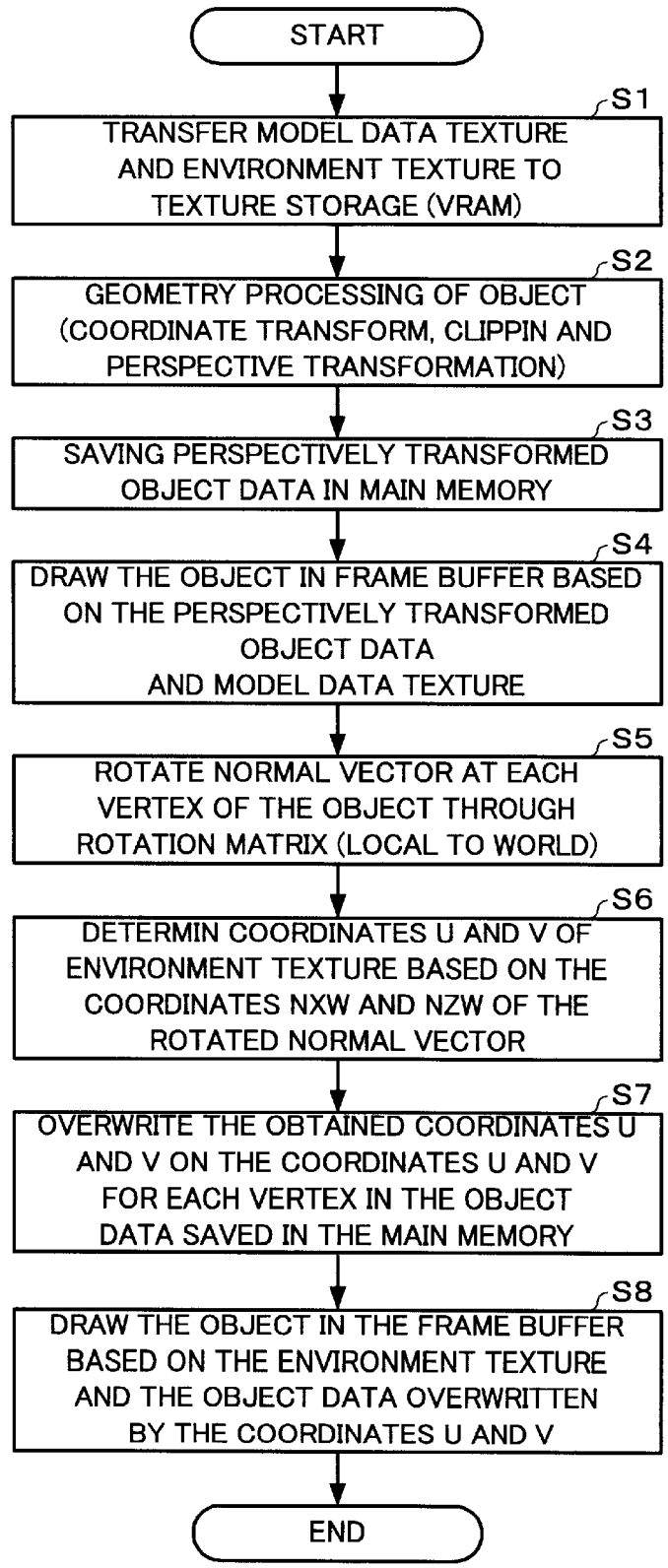
FIG. 13 is a flowchart illustrating the details of a process according to the present embodiment.

The details of the process according to this embodiment will be described with reference to the flowchart of FIG. 13.

First of all, a texture of model data (or a texture previously provided to represent the design of an object) and such an environment texture as shown in FIG. 4 are transferred to a texture storage section on VRAM (step S1).

Next, the object is subjected to the geometry processing, based on object data (vertex coordinates, vertex texture coordinates, brightness data of an object and so on) (step S2). More particularly, the coordinates of the object are transformed from the local coordinate system to the world coordinate system and then transformed from the world coordinate system to the viewpoint coordinate system. After clipping, they are perspectively transformed to the screen coordinate system. After the perspective transformation, the transformed object data are stored and saved in a main memory (step S3).

The object is then drawn in a frame buffer, based on the perspectively transformed object data and the model data texture transferred at the step S1 (step S4). Thus, the object of original design not subjected to the environment mapping will be drawn.

Next, as described in connection with FIGS. 7 and 8, the normal vector at each of the vertexes of the object is rotated through the rotation matrix from the local coordinate system to the world coordinate system (step S5). Coordinates U and V of the environment texture are then determined based on the coordinates NXW and NZW of the rotated normal vectors (step S6). At this time, for example, a calculating formula for determined the coordinate s U and V is as follows:

$$U = (NXW + 1.0)/2 \quad (1)$$

$$V = (NZW + 1.0)/2 \quad (2)$$

This is because the range of change for the coordinates U and V is between 0.0 and 1.0 and the range of change for the coordinates NXW and NZW is between −1.0 and 1.0.

The texture coordinate in the texture space will be specified based on the determined coordinates U and V, an offset address of the texture coordinate, information of texture size and so on.

The so obtained coordinates U and V are then overwritten on the coordinates U and V at each of the vertexes of the object data (or vertex list) which have been saved in the main memory at the step S3 (step S7). In other words, the coordinates U and V set in the model data of the object is replaced by the coordinates U and V determined based on the normal vectors.

Next, the object is drawn in the frame buffer, based on the environment texture transferred at the step S1 and the object data overwritten by the coordinates U and V at the step S7 (step S8) In other words, the object onto which the environment texture of FIG. 4 is mapped is over written and drawn onto the object previously drawn at the step S4 (or the object onto which the model data texture has been mapped). According to this embodiment, the environment mapping is realized by drawing the object twice with the same coordinates.

4. Hardware Configuration

Figure 14:
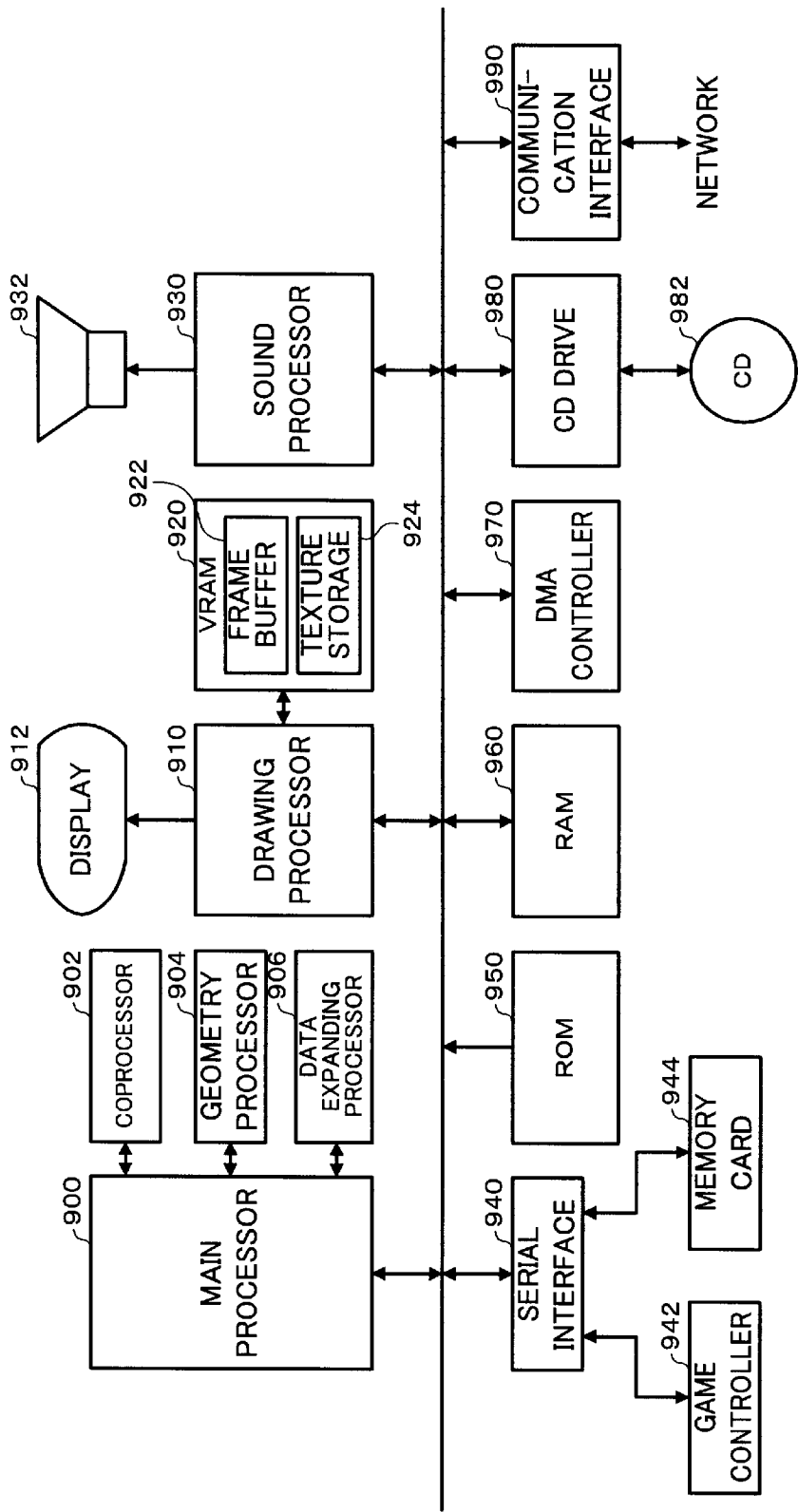
FIG. 14 is a hardware structure capable of realizing the present embodiment.

A hardware configuration capable of realizing this embodiment will be described with reference to FIG. 14.

A main processor 900 is actuated for performing various processings such as game processing, image processing, sound processing and so on, based on a program stored in CD 982 (information storage medium), a program transferred through a communication interface 990, a program stored in ROM 950 (another information storage medium) or the like.

A coprocessor 902 is operative to help the processing of the main processor 900 and includes a product-sum calculator and analog divider which can perform the high-speed computation. Thus, the coprocessor 902 can execute a matrix operation (or vector operation) at high speed. For example, where the matrix or other operation is required to make a physical simulation for moving and acting the object, a program operating on the main processor 900 instructs (or invites) its own processing to the coprocessor 902.

A geometry processor 940 is operative to perform geometry processings such as coordinate transformation, perspective transformation, light source calculation, curve generation and so on, and includes a product-sum calculator and analog divider which can perform the high-speed computation. Thus, the geometry processor 940 can execute a matrix operation (or vector operation) at high speed. For example, the program operating on the main processor 900 can instruct the coordinate transformation, perspective transformation, light source calculation, curve generation and so on to the geometry processor 904.

A data expanding processor 906 is operative to perform a decoding process for expanding compressed image and sound data and another process for accelerating the decoding in the main processor 900. Thus, a compressed animation of MPEG or other type can be displayed in various scenes such as opening, intermission, ending and game scenes. The image and/or sound data to be decoded may be stored in ROM 950 and CD 982 or externally transferred through the communication interface 990.

A drawing processor 910 is operative to draw (or render) an object formed by polygons or primitive faces at high speed. When the object is to be drawn, the main processor 900 utilizes the function of a DMA controller 970 to deliver the object data to the drawing processor 910 and also to transfer the texture to a texture storage section 924, if necessary. Thus, the drawing processor 910 draws the object on a frame buffer 922 at high speed while erasing the shade by use of a Z-buffer or the like, based on the object data and texture. The drawing processor 910 can also perform an α-blending (or translucency processing), a mip-mapping, fogging, tri-linear filtering, anti-aliasing, shading and so on. If an image for one frame has been written into the frame buffer 922, that image is displayed on a display 912.

A sound processor 930 includes a multi-channel ADPCM sound source for generating high-quality game sounds such as BGM, sound effect, voice and others. The generated game sound will be outputted through a speaker 932.

Operational data from a game controller 942, saved data from a memory card 944 and personal data are transferred through a serial interface 940.

ROM 950 has stored a system program and other. With an arcade game system, the ROM 950 functions as an information storage medium for storing various programs. The ROM 950 may be replaced by a hard disk.

RAM 960 is used as a working area for various processors.

The DMA controller 970 is operative to control DMA transfer between the processors and memories (RAM, VRAM, ROM and others).

A CD drive 980 drives the CD (or information storage medium) 982 in which the programs, the image data and the sound data have been stored and can access these programs and data.

The communication interface 990 is for transferring data between the game system and any external through a network. In such a case, the network connected to the communication interface 990 includes a communication line (analog telephone line or ISDN) and a high-speed serial bus. The communication line enables the data transfer through INTERNET. When the high-speed serial bus is used, the data can be transferred between the game system and the other image generating system or game system.

Each means in the present invention may be executed only by the use of hardware or only by a program which has been stored in the information storage medium or delivered through the communication interface or by the use of both the hardware and program.

Where each means of the present invention is to be executed by the use of both the hardware and program, the information storage medium will store a program (and data) for executing each means of the present invention using the hardware. More particularly, the aforementioned program instructs various processings to the processors 902, 904, 910, 930 and so on which are hardware and delivers data to them, if necessary. Each of the processors 902, 904, 910, 930 and so on will execute the corresponding means in the present invention, based on the instruction and delivered data.

Figure 15A:
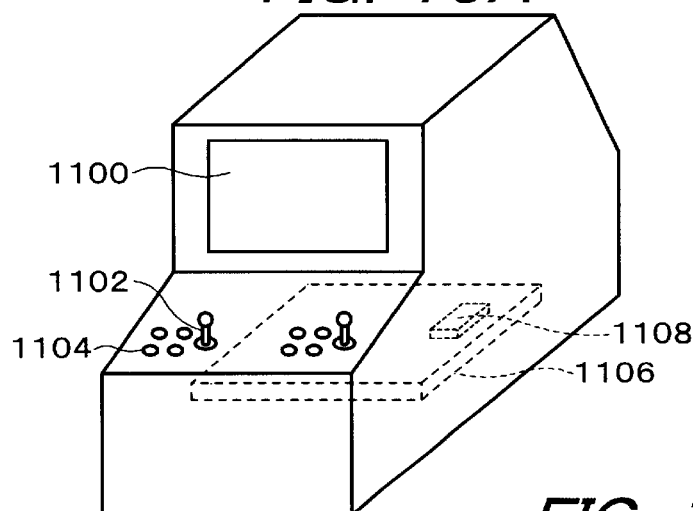
FIGS. 15A, 15B and 15C illustrate various types of system to which the present embodiment can be applied.

FIG. 15A shows an arcade game system to which the present embodiment is applied. Players can enjoy a game by manipulating levers 1102 and buttons 1104 while viewing a game picture displayed on a display 1100. The game system includes a system board (or circuit board) 1106 on which various processors and memories are mounted. A program and/or data for executing each means of the present invention have been stored in a memory (or information storage medium) 1108 on the system board 1106. This information will be referred to "stored information".

Figure 15B:
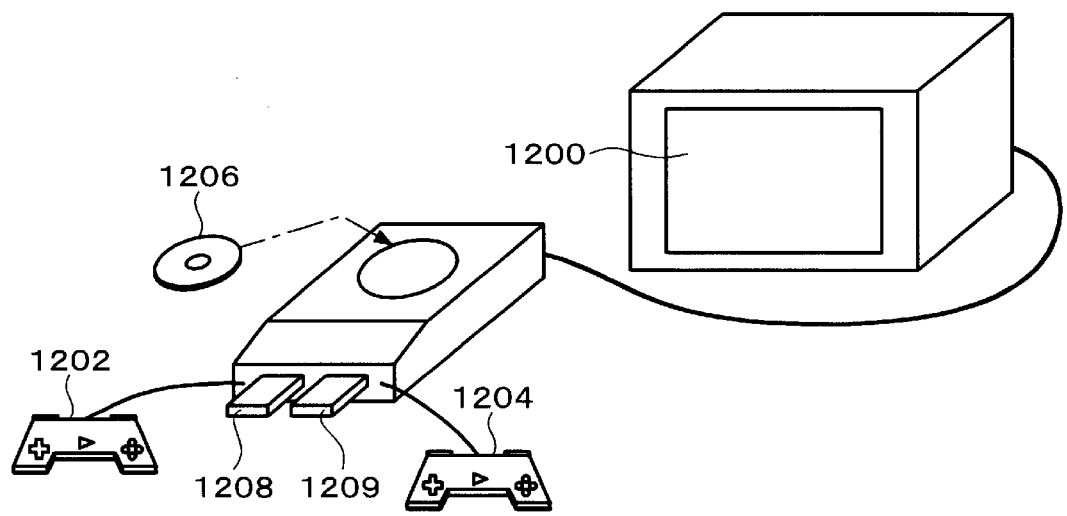

FIG. 15B shows a home game system to which the present embodiment is applied. Players can enjoy a game by manipulating game controllers 1202 and 1204 while viewing a game picture displayed on a display 1200. In this case, the stored information has been stored in a CD 1206 or memory cards 1208 and 1209 which are information storage media detachable into the main system body.

Figure 15C:
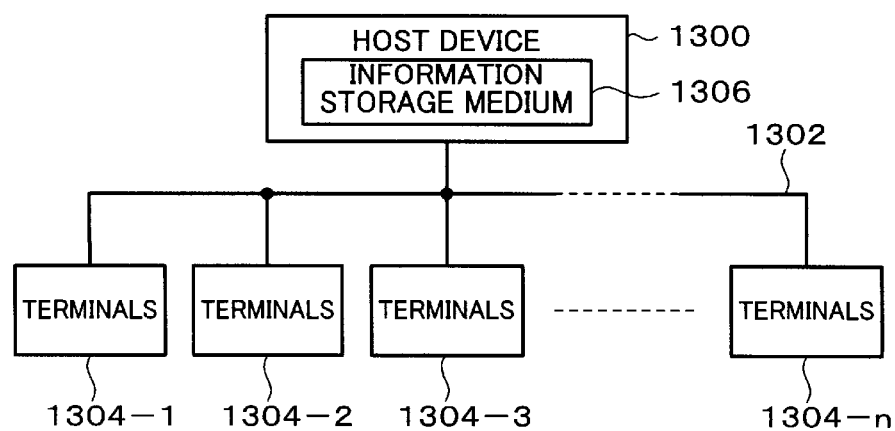

FIG. 15C shows an example wherein this embodiment is applied to a game system which includes a host device 1300 and terminals 1304-1 to 1304-n connected to the host device 1300 through a network 1302 (which may be a small-scale network such as LAN or a global network such as INTERNET). In such a case, the above stored information has been stored in an information storage medium 1306 such as magnetic disk device, magnetic tape device, memory or the like which can be controlled by the host device 1300, for example. If the terminals 1304-1 to 1304-n can generate game images and sounds in a stand-alone manner, the host device 1300 delivers game program and other data for generating game images and sounds to the respective terminals 1304-1 to 1304-n. On the other hand, if the game images and sounds cannot be generated by the terminals in the stand-alone manner, the host device 1300 will generate the game images and sounds which are in turn transmitted to the terminals 1304-1 to 1304-n.

In the arrangement of FIG. 15C, each means of the present invention may be executed by decentralizing into the host device (or server) and terminals. The above stored information for executing each means of the present invention may be distributed and stored into the information storage media in the host device (or server) and terminals.

Each of the terminals connected to the communication line may be either of home or arcade type. When the arcade game systems are connected to the communication line, it is desirable that each of the arcade game systems includes a portable information storage device (memory card or portable game machine) which can not only transmit the information between the arcade game systems but also transmit the information between the arcade game systems and the home game systems.

The present invention is not limited to the things described in connection with the above forms, but may be carried out in any of various other forms.

In the invention relating to a sub-claim, part of any other claim to which the sub-claim depends may be omitted. Furthermore, the primary parts of the invention relating to one independent claim may be caused to depend on any other independent claim.

The shape or design of the environment texture mapped according to the present invention is desirably one as shown in FIG. 4, but not limited to such a form.

Figure 8:
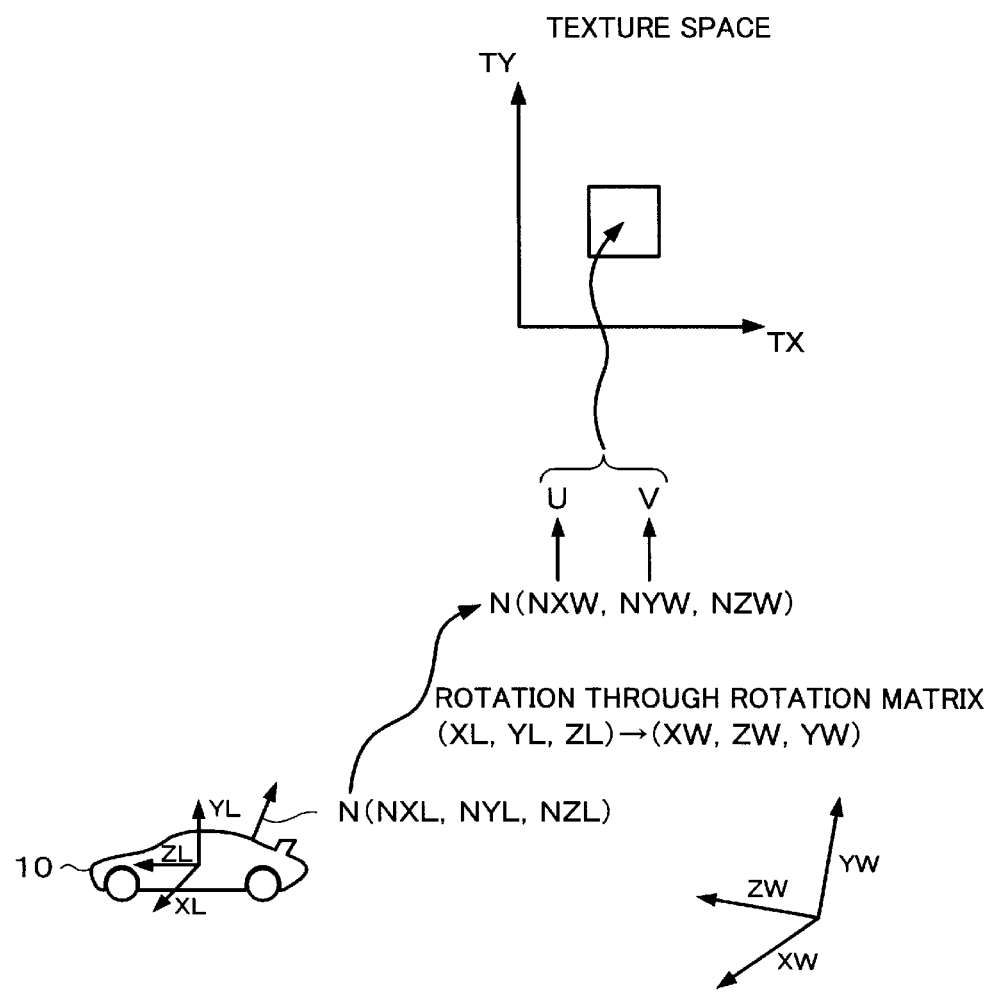
FIG. 8 is a view illustrating another technique of determining texture coordinates by causing a rotation matrix to rotate a normal vector.

The technique of determining the texture coordinate for reading the environment texture is particularly desirably one as describe in connection with FIGS. 7 to 9, but may be carried out in any of various other forms.

Where the image generating system supports the multi-texture mapping (or narrow multi-texture mapping) function in which a plurality of textures are mapped on one object in a hardware manner, it is desirable that both the model data and environment textures are mapped over the object at the same time. Where a plurality of textures are overlaid on one object in such a manner, it is preferred that the object data contain a plurality of texture coordinate sets, that is, a texture coordinate for specifying the model data texture and another texture coordinate for specifying the environment texture.

The textures to be mapped onto the object are not limited to textures of color information, but may be any one of textures relating to brightness information, transparency information (a value), surface shape information (bump value), reflectance information, reflective index information and depth information.

Other than the racing game, the present invention may similarly be applied to any of various other games such as fighting games, robot combat games, sports games, competitive games, roll-playing games, music playing games, dancing games and so on.

Furthermore, the present invention can be applied to various image generating systems such as arcade game systems, home game systems, large-scaled multi-player attraction systems, simulators, multimedia terminals, image generating systems, game image generating system boards and so on.

What is claimed is:

1. An image generating system comprising:
a memory which stores a program and data for image generating; and
at least one processor which is coupled with the memory and performs processing for image generating, the memory including a texture storage section which stores a texture of an environment to be viewed in an upward direction from an object, and the processor including a texture mapping section which reads the environment texture out from texture storage section and maps the read environment texture onto the object in a direction toward the object from above the object independently of a position or a rotational angle of a virtual camera; and
a drawing section which draws an image viewed from the virtual camera within an object space in which the object moves with changing rotation angle, wherein a rotation matrix obtained based on the rotational angle of the object about each of axes in a world coordinate system is used to rotate a normal vector of a surface of the object, and wherein first and second texture coordinates for reading the environment texture out from the texture storage section are obtained based on first and second coordinates of the rotated normal vector.

2. The image generating system according to claim 1, wherein the rotation matrix transforms a local coordinate system (XL, YL, ZL) of the object to a coordinate system (XW, ZW, YW), when the local coordinate system is (XL, YL, ZL) and a world coordinate system is (XW, YW, ZW), and wherein the first and second coordinates are XW and YW coordinates, respectively.

3. The image generating system according to claim 1, wherein with a surface of the object of which the normal vector is oriented downwardly and slantingly with respect to a horizontal direction, an environment texture otherwise intended to be mapped when the normal vector of a surface of the object is oriented horizontal or substantially horizontal is mapped.

4. The image generating system according to claim 1, wherein the environment mapping is omitted in respect of the surface of the object of which the normal vector is oriented downwardly and slantingly with respect to a horizontal direction.

5. The image generating system according to claim 1, the processor further comprising a shading section which performs shading processing, wherein brightness of the environment texture increases when the normal vector of the surface of the object is oriented toward a light source for the shading processing.

6. A computer-usable program embodied on an information storage medium or in a carrier wave, comprising a processing routine for realizing:
a texture storage section which stores a texture of an environment to be viewed in an upward direction from an object,
a texture mapping section which reads the environment texture out from the texture storage section and maps the read environment texture onto the object in a direction toward the object from above the object independently of a position or a rotational angle of a virtual camera; and
a drawing section which draws an image viewed from the virtual camera within an object space in which the object moves with changing rotation angle, wherein a rotation matrix obtained based on the rotational angle of the object about each of axes in a world coordinate system is used to rotate a normal vector of a surface of the object, and wherein first and second texture coordinates for reading the environment texture out from the texture storage section are obtained based on first and second coordinates of the rotated normal vector.

7. The program according to claim 6, wherein the rotation matrix transforms a local coordinate system (XL, YL, ZL) of the object to a coordinate system (XW, ZW, YW), when the local coordinate system is (XL, YL, ZL) and a world coordinate system is (XW, YW, ZW), and wherein the first and second coordinates are XW and YW coordinates, respectively.

8. The program according to claim 6, wherein with a surface of the object of which the normal vector is oriented downwardly and slantingly with respect to a horizontal direction, an environment texture otherwise intended to be mapped when the normal vector of a surface of the object is oriented horizontal or substantially horizontal is mapped.

9. The program according to claim 6, wherein the environment mapping is omitted in respect of the surface of the object of which the normal vector is oriented downwardly and slantingly with respect to a horizontal direction.

10. The program according to claim 6, further realizing a shading section which performs shading processing wherein brightness of the environment texture increases when the normal vector of the surface of the object is oriented toward a light source for the shading processing.

* * * * *